Jan. 14, 1930. J. M. MACRAE 1,743,150
MILLING MACHINE
Filed Oct. 22, 1925 4 Sheets-Sheet 1

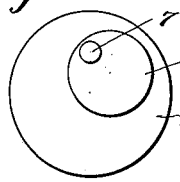 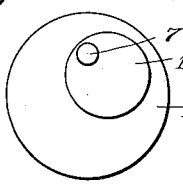 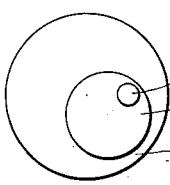 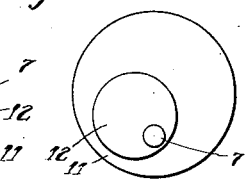
Fig. 3.   Fig. 5.   Fig. 7.   Fig. 9.
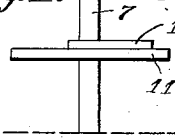 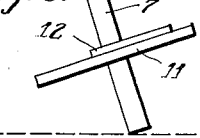 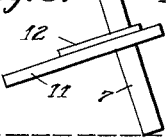 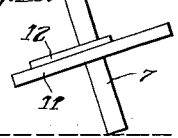
Fig. 4.   Fig. 6.   Fig. 8.   Fig. 10.
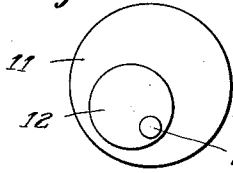 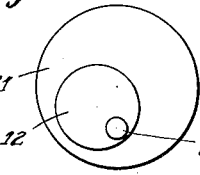 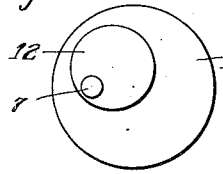 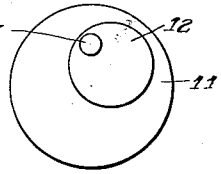
Fig. 11.   Fig. 13.   Fig. 15.   Fig. 17.
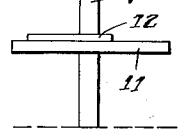 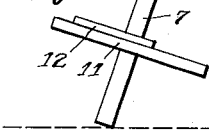 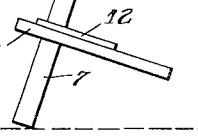 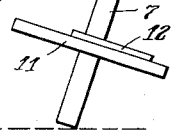
Fig. 12.   Fig. 14.   Fig. 16.   Fig. 18.

Jan. 14, 1930.  J. M. MACRAE  1,743,150
MILLING MACHINE
Filed Oct. 22, 1925   4 Sheets-Sheet 4
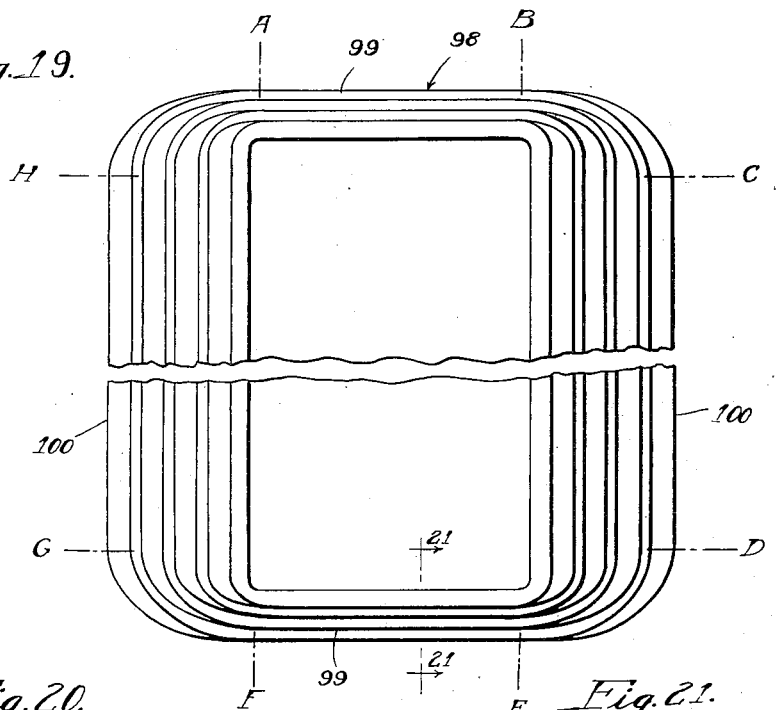
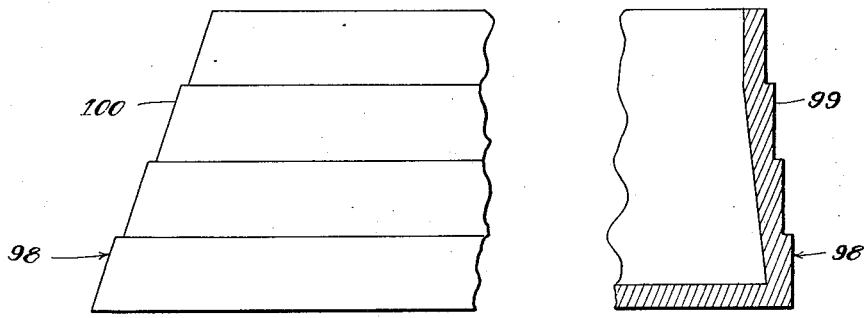
Inventor:
John M. Macrae
By Wilson & McCanna
Attys.

Patented Jan. 14, 1930

1,743,150

UNITED STATES PATENT OFFICE

JOHN M. MACRAE, OF ROCKFORD, ILLINOIS, ASSIGNOR TO THE INGERSOLL MILLING MACHINE COMPANY, OF ROCKFORD, ILLINOIS, A CORPORATION OF ILLINOIS

MILLING MACHINE

Application filed October 22, 1925. Serial No. 64,098.

This invention relates to milling machines and more particularly is concerned with a single spindle machine especially designed for milling the straight ends and the angular or tapered sides of safe doors and jambs and also the rounded corners thereof, although the machine is capable of a variety of other heavy duty uses that may involve practically universal manipulation of the spindle relative to the work, such as tilting, extensibility and retractibility, adjustability of position on a rotary carriage, and feeding rectilinearly and on a radius relative to the work.

Briefly stated, the invention provides a milling machine comprising a bed having a table movable back and forth thereon and cross rails providing guides for a pair of slides that support a cradle on trunnions for tilting movement. The cradle carries a revolving saddle in which a spindle support is mounted off center, the spindle itself rotating in bearings in said support which are eccentric relative to the support, the spindle support being rotatable with respect to the revolving saddle for milling a small radius or adjusting the radius to be cut by revolving the saddle. In addition to the adjustability of the spindle in the manner referred to, an up and down adjustment may be made relative to the work when the spindle is vertical or tilted. The table is adjustable or fed lengthwise of the bed and the cradle moves crosswise relative to the table on the cross rails with the cradle slides that operate thereupon.

The invention is more fully described in the following specification in which reference is made to the accompanying drawings, wherein—

Figs. 3 to 18 are diagrammatic views illustrating the manipulations of the spindle for the production of a safe door such as that shown in Fig. 19, the odd numbered figures representing plan views of the even numbered figures to show the radius adjustment of the spindle while the even numbered figures show whether the spindle is vertical or tilted;

Fig. 19 is a rear view of a safe door of the type intended to be produced by the present machine having straight top and bottom ends and tapered sides;

Fig. 20 is a fragmentary end view of the door to show the tapering of the sides; and Fig. 21 is a sectional detail of one end of the door taken on the line 21—21 of Fig. 19.

Throughout the views the same reference numerals are applied to corresponding parts.

Figure 1:
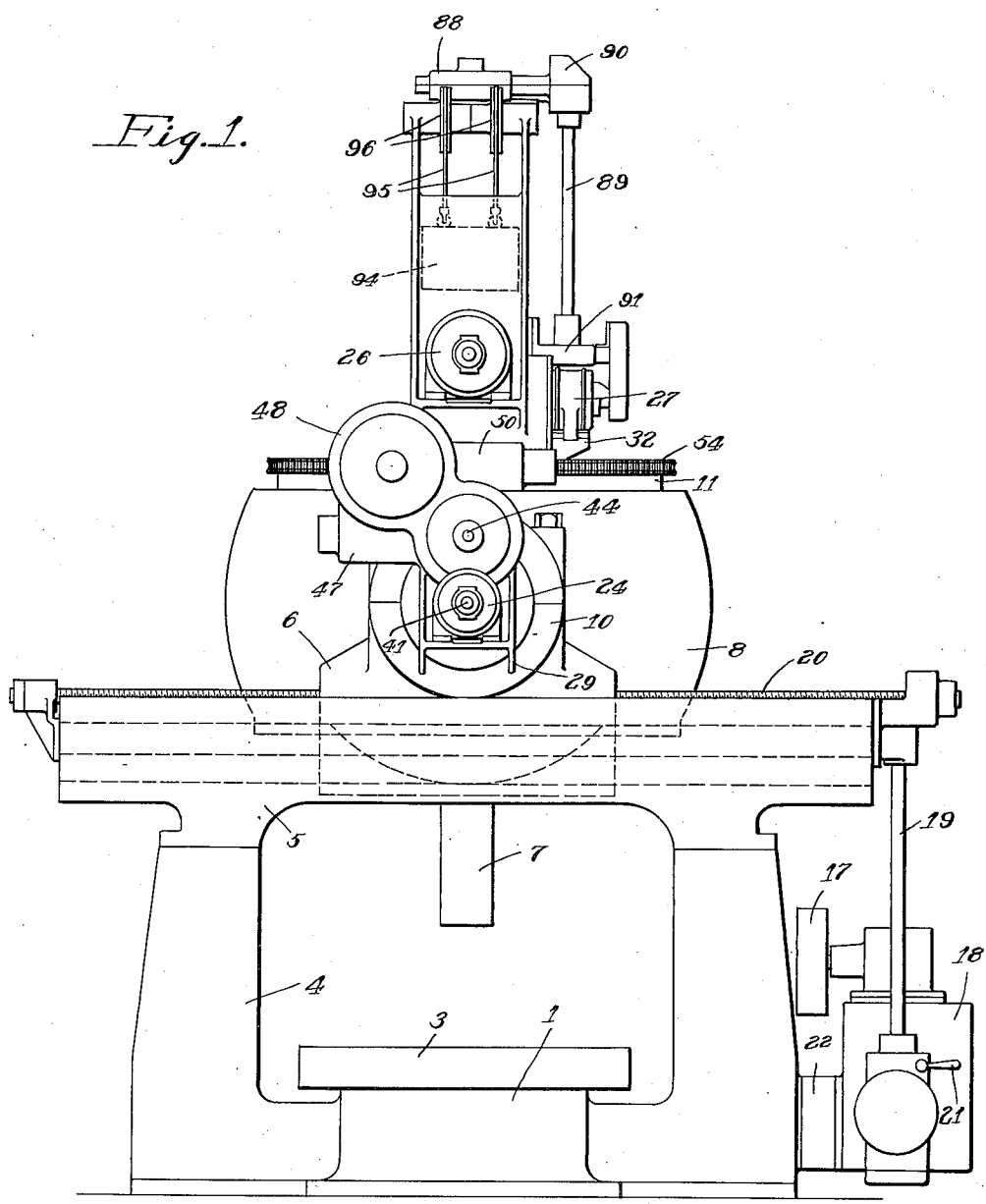
Fig. 1 is an end view of the milling machine.

The milling machine illustrated is of particularly massive construction and intended for a special heavy duty use as above mentioned. Although the mentioning of any particular over-all dimensions of the machine is not to be regarded as limiting the invention in any manner to a machine of a special size, it may be stated that the present machine is about 16 feet tall, weighs about 80 tons, and has a spindle elevation relative to the table of from about 12 inches to 60 inches. This immense size has, of course, imposed certain restrictions upon the design of certain features of the machine. However, it will be understood the invention is applicable to machines of different types and sizes when the proper accommodations are made. The invention is, therefore, limited only as necessitated by the state of the prior art.

As illustrated in the drawing, the machine comprises a bed 1 having ways 2 for a table 3 movable back and forth thereon. Two pairs of columns 4 are suitably fastened to the bed and doweled to insure permanency of alignment. The columns 4 support a pair of cross rails 5. The rails 5 are finished on the top and inside faces thereof to provide ways for slides 6 movable crosswise relative to the table 3 for feeding or adjusting the position of cutter-supporting spindle 7. A cradle 8 is tiltable with respect to the slides or carriages 6 on trunnions 9 received in bearings 10 on the slides. The cradle is capable of tilting in either direction to the extent of about 20° to the vertical although of course the precise degree of tilt to be provided for may vary according to the kind of work it is desired to perform. The cradle 8 carries a revolving saddle 11 which in turn provides a mounting for a spindle support 12. The spindle support is off center relative to the saddle 11 as illustrated and the spindle 7 is rotatable in bearings 13 in the support 12 which are eccentrically arranged. The description thus far is intended only to give a general understanding or perspective of the invention. It will be seen that the work clamped on the table 3, as for example a safe door or jamb, may be advanced to the spindle and fed with respect thereto in the milling off of a side of the door or jamb. In the present instance the spindle will be inclined to the vertical in the milling of either side of the door or jamb. In milling either end of the work the spindle is fed crosswise with respect to the table and will of course make a vertical cut. The spindle is disposed vertically in milling the ends of the work and tilts in either direction on coming to either side of the work where a tapered cut is to be made. The adjustability of the spindle by virtue of its eccentric mounting in the support 12 permits any variation in the operating radius from a zero radius to the maximum radius illustrated in Fig. 2 for cutting radii by revolving the saddle 11. In milling the rounded corners of the work the spindle is set at the proper radius by the adjustment of the support 12 and the spindle is fed in an arc by the revolving of the saddle 11. A vertical cut on a radius may be made in this way where the spindle remains vertically disposed. In the present case, however, the spindle is tilted so that a taper cut on a radius is made. Obviously, the tilting of the spindle will not affect the vertical cut made on the ends of the work. In tilting the spindle it is, however, necessary to jog it up or down, as the case maybe, to maintain the same elevation of the end of the cutter relative to the table or the work thereon. This vertical adjustment is secured by a screw 14 operating in a nut 15 which in turn provides any ordinary type of thrust bearings 16 for rotatably receiving the upper end of the spindle 7 on the nut 15 so that the spindle will move endwise with the nut when the latter is adjusted on the screw.

The table 3 and the cradle slides 6 are suitably capable of hand and power adjustment. At 17 is illustrated a pulley which drives suitable gearing in a housing 18 for transmitting motion to a stand shaft 19 to drive the two feed screws 20 when a clutch controlled by a hand lever 21 is properly engaged. The two screws are geared together in any suitable manner so as to operate in unison. There is also an operating connection extending from the housing 18 through the housing 22 for operating the table 3. The feed of either the table 3 or the slides 6 is reversible. It will not be necessary to illustrate or describe the hand adjustments provided for these parts as they are well known to the art. Separate sources of motive power are provided for the tilting of the cradle, for revolving the saddle, for adjusting the spindle support, and for driving and adjusting the elevation of the spindle. It will suffice for the present to indicate in a general way the means for driving the different parts referred to. Thus a motor 23 serves to tilt the cradle 8 on its trunnions 9. Another motor 24 revolves the saddle 11 in the cradle and a separate motor 25 is provided for setting the spindle support 12 to the desired operating radius for the spindle 7. The spindle is driven by a motor 26 and has its up and down adjustment secured by a motor 27. Due to the number of motors employed and because of the character of work performed, it becomes important to make some convenient provision for the mounting of the switch keys for controlling said motors, and, while the same may take various forms, it is contemplated to provide banks of switch keys on a portable carrier similar to an annunciator push-button block, which the operator or operators of the machine may carry about in controlling the movements and setting of the machine, the carrier having flexible cable connections permitting movement of the operator from one part of the machine to another or round and about the same for observation of the work from all angles. The motor 23, which tilts the cradle 8, is preferably mounted on a ledge 28 provided on one of the cradle slides 6. The motor 24 for revolving the saddle 11 is carried on a bracket 29 that is supported in one of the trunnions 9 so as to have the motor move with the cradle. The other motors 25, 26 and 27 move with the cradle in its tilting, the motor 25 being supported on a shelf 30 provided inside the saddle 11, while the motors 26 and 27 are supported on brackets 31 and 32 respectively, provided on the platform 33 mounted on the spindle support 12. In this way, the motor 25 tilts with the cradle and revolves with the saddle, while the motors 26 and 27 not only tilt with the cradle and revolve with the saddle, but also revolve with the spindle support. The foregoing will suffice to give a basis for an easier understanding of the more specific description of the structure and operation of the machine that follows.

*Cradle tilting means*

The motor 23 has a worm on its armature shaft 34 meshing with a worm gear inside the housing 35. The last mentioned gear has a worm on the shaft thereof, inside the housing extension 36 meshing with a worm gear in the housing 37 for driving a worm 38. The latter meshes with a worm gear sector 39 fixed on the cradle 8 above one of the trunnions 9 at one side of the cradle. The operator tilts the cradle by depressing the proper switch key to set the motor 23 in operation. When the desired tilt is secured, which the operator will note by the movement of an index on the cradle relative to a scale preferably on the cradle slide, he will shut off the motor by depressing another key associated with the first key in his portable control set. A suitable hand adjustment (not shown) may also be provided if desired for the cradle to enable, or at least facilitate, more accurate setting of the tilt of the cradle. The bolts 40, as illustrated are provided for clamping the cradle in its adjusted position. The motor 23 is reversible so that the cradle may be tilted in either direction as desired and can be brought back to its normal vertical position from a tilted position.

Saddle revolving means

The motor 24, as stated above, is supported on a bracket 29 secured to one of the trunnions 9 so as to tilt with the cradle. The bracket 29 provides bearings for the armature shaft 41 on which a gear 42 is fixed to drive a gear 43 on a countershaft 44. A bevel gear 45 on the shaft 44 meshes with another bevel gear 46 for driving a worm within the housing 47. The last mentioned worm drives a worm gear within the housing 48 to drive the shaft 49 extending from the housing 48 to a housing 50 mounted on top of the cradle 8 as illustrated. A bevel gear 51 on the shaft 49 inside the housing 50 meshes with another bevel gear 52 to drive a worm 53 meshing with the worm ring gear 54 bolted on top of the saddle 11 as indicated. The saddle 11 is of hollow cylindrical form, as illustrated, with a reduced lower end 55 defined by an annular shoulder 56 resting on a bearing 57. A top tapered bearing 58 and a bottom tapered bearing 59 serve as further supports for the saddle 11 within the cradle 8 and permit of adjustment for taking up wear. The motor 24 is preferably a constant speed, reversible motor and is arranged for control similarly to the motor 23 to adjust or feed the revolving saddle. The spindle 7 when set to the proper radius, as will presently be described, is fed in an arc or in a circle as the nature of the work requires. Obviously, the tilting of the cradle in no way affects the adjusting or feeding of the saddle. The adjustment of the saddle locates the spindle in any desired position with respect to the work on the table. Suitable means (not shown) may be provided if desired for adjusting the saddle by hand.

Spindle support operating means

Figure 2:
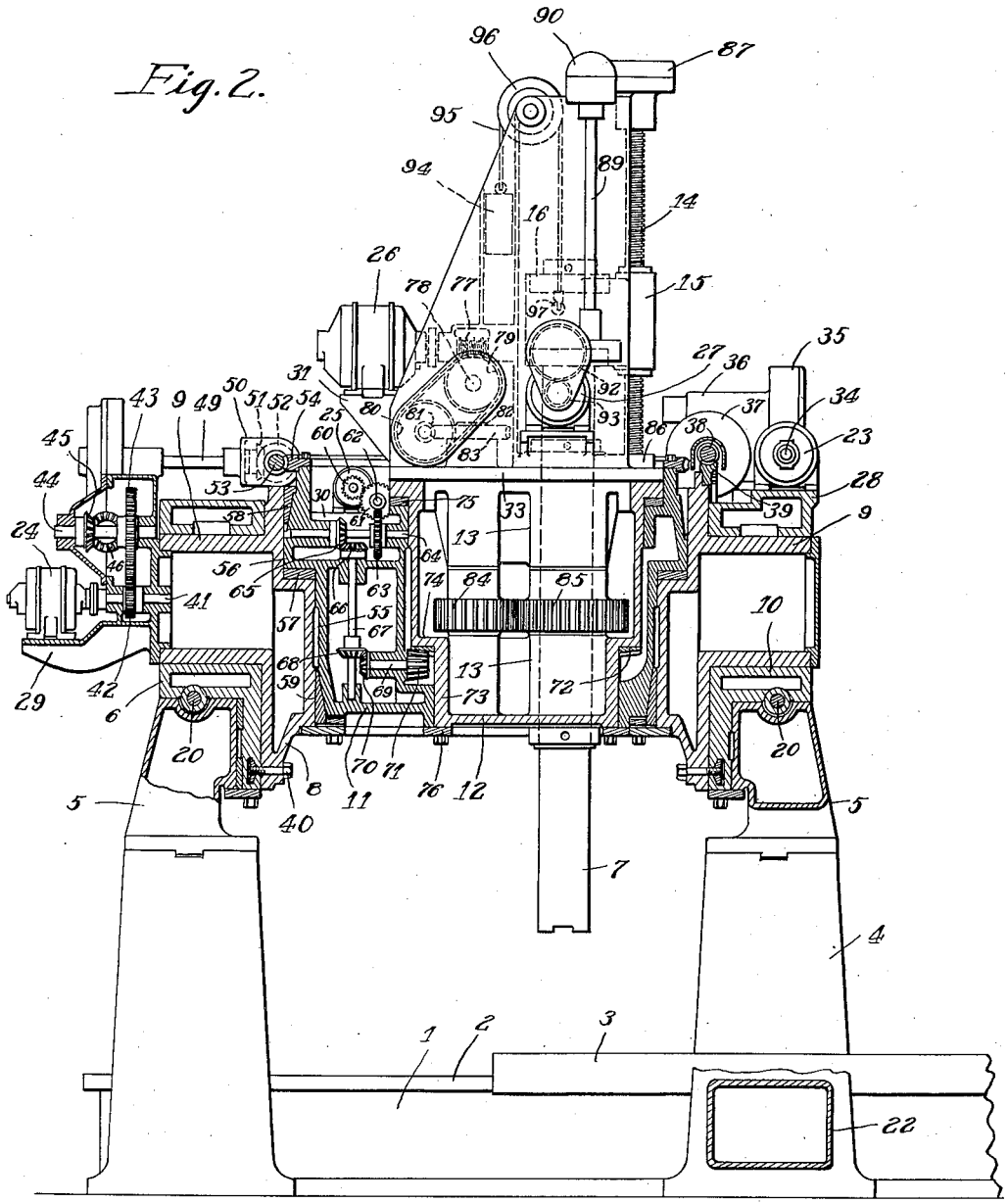
Fig. 2 is a longitudinal vertical section through the top of the machine with the table and bed appearing in side elevation.

The motor 25 has a gear 60 on the armature shaft thereof, meshing with a gear 61 for driving a worm 62. This worm meshes with a worm gear 63 to drive the shaft 64 received in bearings in the saddle 11. A bevel gear 65 on the shaft 64 meshes with another bevel gear 66 on a stand shaft 67, also suitably supported in bearings in the saddle 11. A bevel gear 68 near the bottom of the shaft 67 drives a stub shaft 69 through a bevel gear 70 thereon. The other end of the shaft 69 carries a bevel gear 71 meshing with a bevel ring gear 72 fixed to the spindle support 12. The spindle support, it will be noted, is of a hollow, cylindrical form and is arranged off center with respect to the saddle 11. The reduction of the lower end 73 of the spindle support provides an annular shoulder at 74 on which the ring gear 72 is secured. The spindle support is received in an upper bearing 75 and a lower bearing 76 in the saddle 11. The bearings 13 provided in the support 12 and on a depending portion of the platform 33 are arranged eccentrically with respect to the spindle support sufficiently so that it is possible to arrange the spindle 7 at the exact center of the revolving saddle 11. In Fig. 2, the spindle is shown at a position of maximum radius relative to the center of the saddle. Any variation in radius desired from this maximum radius is obtainable by the rotation of the spindle support. The motor 25 is preferably a constant speed, reversible motor to facilitate adjustment of the spindle to the desired point. Manual means (not shown) may be provided if desired for rotating the spindle support by hand to permit, or at least facilitate, accurate adjustment of the operating radius of the spindle. Obviously, it is possible to operate the spindle in a circle by revolving the spindle support while the saddle 11 is stationary. With the combination of the saddle 11 and spindle support 12, it is possible to mill any desired radius within the limits of the machine, the present machine affording a range of from zero to 18 inches. The spindle support is suitably graduated in any well known manner to denote the eccentricity of the spindle with respect to the saddle in inches. It is hardly necessary to state that the operations just referred to are unaffected by the tilting of the cradle.

Spindle drive

The motor 26 on the bracket 31 is coupled with a worm 77 driving a worm gear on the shaft 78 on which shaft a sprocket 79 is also provided. This sprocket has driving connection with another sprocket 80 through the chain connection indicated to drive a worm 81 which in turn drives the jack shaft 82 through the medium of the worm gear 83. The gear 84 on the shaft 82 drives the gear 85 on the spindle 7. The gear 85 has a splined connection with the spindle 7 to permit adjustment of the latter up and down relative to the work, as will presently appear. The motor 26 for driving the spindle 7 is preferably of a variable speed type allowing a range of from about 500 to 1500 R. P. M. The controlling of the motor speeds may, of course, be taken care of by the operator with his control set.

*Spindle adjusting means*

The spindle 7, illustrated, is of the bar type and is rotatably supported, as above described, in thrust bearings 16 in a lateral extension off the nut 15 which has the screw 14 threading therein. The screw 14 is received in a bearing 86 on the top of the platform 33 and is driven by a worm gear in the housing 87 at its upper end. A worm in the housing extension 88 drives the worm gear and is in turn driven from a stand shaft 89 through a pair of meshing bevel pinions in the housing 90. The shaft 89 is driven by a worm gear in the housing 91 meshing with a worm driven by the gear 92 meshing with the gear 93 on the armature shaft of the motor 27. The weight of the spindle is counterbalanced by a counterweight 94 having cables 95 passing over sheaves 96 and attached to the nut 15 as indicated at 97. The motor 27 is preferably of a variable speed, reversible type permitting the jogging up and down of the spindle at different speeds as desired. The up and down adjustment of the spindle relative to the work on the table is required for the operation on the different steps on the sides or ends of a safe door, for example. The adjustment is also required to keep the same elevation of the end of the spindle relative to the work when the spindle is tilted from a vertical position.

*Operation*

In describing the operation of the machine, reference may be had to a specific class of work for which the machine was designed. For example, in Figs. 19–21 a safe door 98 is illustrated having straight top and bottom ends 99 and tapered sides 100, both the straight and the tapered sides being stepped, as shown in Figs. 20 and 21. The jamb for the door will, of course, be of a complementary or converse formation for obvious reasons. In Figs. 3–18 all of the positions of the spindle, spindle support and revolving saddle required in the production of a safe door such as that just described are illustrated. Assuming that a rough casting of the door is clamped upon the table 3 and brought up to position alongside the spindle 7 to have one of the steps machined about the four sides of the door, one of the ends 99 will be presented to the cutter on the spindle 7. The spindle starting from one corner at the end of the door from the station A is fed across the end crosswise of the table to the station B by feeding the cradle 8 with the slides 6 along the cross rails 5. The positions of the spindle 7, revolving saddle 11 and spindle support 12 corresponding to this operation are shown diagrammatically in Figs. 3 and 4. At the station B, the cradle 8 is tilted to tilt the spindle 7 as indicated in Fig. 6, the parts being left otherwise in their same respective positions except for an extension of the spindle to keep the lower end thereof at the same elevation as before, this constant elevation being represented by a dotted line in the drawing. With the spindle tilted the saddle 11 is revolved through an arc of 90° to the station C, thus providing a rounded corner with a vertical face on the end 99 merging into a tapered face on the side 100. The new arrangement of the parts is indicated in Figs. 7 and 8. The table 3 is now fed forward to mill off the tapered side from station C to D. At station D, the saddle 11 is revolved again through 90° to bring the cutter on the spindle to the station E. The new relative arrangement of parts is shown in Figs. 9 and 10. At station E the saddle is righted, as indicated in Figs. 11 and 12, and is then fed crosswise of the table to the station F to mill off the lower end 99. At F the spindle is again tilted, as indicated in Fig. 14, and is fed in an arc, as shown in Figs. 15 and 16, to the station G. In all of the steps referred to, the proper accommodation of the elevation of the lower end of the spindle is made to keep approximately on the dotted line shown in the drawing to represent this elevation. The table 3 is fed back with the spindle in the position shown in Fig. 16 until the station H is reached. Here again the saddle 11 is revolved through 90° in going from the station H to the station A. This last manipulation is represented in Figs. 17 and 18. It is obvious that the milling operations described will make square finished shoulders to define the edges at only the ends of the door. The continuation of these square shoulders from B to E and from F to A may be performed by using the spindle in a vertical position, to rout off any material left because of the fact that between these points the spindle was inclined in the first operation. The foregoing will suffice to give a fairly clear understanding of the operation of the machine. It will be understood, of course, that the machine is capable of many other kinds of work that may involve similar complicated manipulations of the spindle, such as tilting, extensibility and retractibility, adjustability of position on a rotary carriage, and feeding in a straight line or on a radius relative to the work.

I claim:

1. In a milling machine the combination of a work support, a rotary spindle, a tiltable cradle for mounting said spindle, and a rotary saddle in said cradle for supporting said spindle and revolving the same in an orbit relative to said cradle.

2. In a milling machine the combination of a work support, a rotary spindle, a tiltable cradle for mounting said spindle, a rotary saddle in said cradle for supporting said spindle and revolving the same in an orbit relative to said cradle, and means for adjusting said spindle in and out relative to said saddle.

3. In a milling machine, the combination of a work support, a rotary spindle, a tiltable cradle for mounting the same, a revolving saddle in said cradle, and a spindle support bearing said spindle and arranged eccentrically with respect to said saddle.

4. In a milling machine, the combination of a work support, a rotary spindle, a tiltable cradle for mounting the same, a revolving saddle in said cradle, and a spindle support bearing said spindle and arranged eccentrically with respect to said saddle, said spindle support being rotatable relative to said saddle and having said spindle eccentric with respect to itself.

5. In a milling machine, the combination of a work support, a rotary spindle, a tiltable cradle for mounting the same, a revolving saddle in said cradle, a spindle support bearing said spindle and arranged eccentrically with respect to said saddle, and means for adjusting said spindle in and out relative to said support.

6. In a milling machine, the combination of a work support, a rotary spindle, a tiltable cradle for mounting the same, a revolving saddle in said cradle, and a spindle support bearing said spindle and arranged eccentrically with respect to said saddle, said spindle support being rotatable relative to said saddle and having said spindle eccentric with respect to itself, and means for adjusting said spindle in and out relative to said support.

7. In a milling machine, a bed, a table moving thereon, cross rails over said bed and table, a cradle slide moving thereon crosswise relative to said table, a cradle supported by trunnions on said slide for tilting relative to said table, a saddle rotatably mounted on said cradle, a spindle support rotatably mounted on said saddle and arranged eccentric relative thereto, and a rotary spindle mounted eccentrically in said support.

8. In a milling machine, a bed, a table moving thereon, cross rails over said bed and table, a cradle slide moving thereon crosswise relative to said table, a cradle supported by trunnions on said slide for tilting relative to said table, a saddle rotatably mounted on said cradle, a spindle support rotatably mounted on said saddle and arranged eccentric relative thereto, and a rotary spindle mounted eccentrically in said support and adjustable lengthwise relative thereto toward and away from said table.

9. In a milling machine, the combination with a work support, of a rotary spindle, a carriage therefor, a tilting cradle for mounting said spindle on said carriage, a rotary saddle mounted in the cradle and having the spindle carried thereby, motive means for tilting said cradle relative to said carriage mounted on said carriage, and motive means for driving said spindle supported by said cradle.

10. In a milling machine, the combination with a work support, of a rotary spindle, a carriage therefor, a tilting cradle for mounting said spindle on said carriage, a rotary saddle mounted in the cradle and having means thereon for adjustably supporting the spindle whereby said spindle is arranged to be positioned centrally or eccentrically with respect thereto, motive means for tilting said cradle relative to said carriage mounted on said carriage, motive means for driving said spindle supported by said cradle, and means for adjusting said spindle in and out relative to said cradle supported by said cradle.

11. In a milling machine, the combination with a work support, of a rotary spindle, a carriage therefor, a tilting cradle supported by said carriage, a revolving saddle in said cradle bearing said spindle eccentrically relative thereto, motive means for tilting said cradle relative to said carriage mounted on said carriage, motive means for revolving said saddle relative to said cradle and mounted on said cradle, and motive means for driving said spindle supported by said saddle.

12. In a milling machine, the combination with a work support, of a rotary spindle, a carriage therefor, a tilting cradle supported by said carriage, a revolving saddle in the cradle bearing said spindle eccentrically relative thereto, motive means for tilting said cradle relative to said carriage mounted on said carriage, motive means for revolving said saddle relative to said cradle and mounted on said cradle, motive means for driving said spindle supported by said saddle, and means for adjusting said spindle in and out with respect to said saddle supported by said saddle.

13. In a milling machine, the combination with a work support, of a rotary spindle, a carriage therefor, a tilting cradle supported by said carriage, motive means for tilting said cradle with respect to said carriage mounted on said carriage, a revoluble saddle in said cradle, motive means for revolving said saddle with respect to said cradle mounted on said cradle, a spindle support mounted off center in said saddle for rotation therein, motive means on said saddle for turning said spindle support relative thereto, and motive means on said spindle support for driving said spindle.

14. In a milling machine, the combination with a work support, of a rotary spindle, a carriage therefor, a tilting cradle supported by said carriage, motive means for tilting said cradle with respect to said carriage mounted on said carriage, a revoluble saddle in said cradle, motive means for revolving said saddle with respect to said cradle mounted on said cradle, a spindle support mounted off center in said saddle for rotation therein, motive means on said saddle for turning said spindle support relative thereto, motive means on said spindle support for driving said spindle, and means for adjusting said spindle in and out relative to said support mounted on said support.

15. In a milling machine, a frame, a table reciprocable on ways thereon to carry work back and forth to be operated upon, a rotary spindle arranged to carry a cutter to operate on the work, a slide supporting said spindle reciprocable on ways provided on said frame to move crosswise with respect to said table whereby to perform cutting operations on the work along one dimension thereof, and a cradle pivoted on a horizontal axis that is always parallel to the direction of movement of the table for tiltably mounting said spindle on said slide whereby to dispose the cutter at an angle to its normal in either direction, said table being arranged to move to feed the work relative to the spindle in its inclined positions whereby to perform cutting operations on the work along another dimension.

16. In a milling machine, a frame, a table reciprocable on ways thereon for carrying work back and forth to be operated upon, a rotary spindle arranged to carry a cutter to operate on the work, a slide for supporting said spindle reciprocable on ways provided on said frame in transverse relation to the aforementioned ways whereby the spindle may be brought to any position toward either side of the table and may be fed crosswise with respect to the table so that cutting operations may be performed on the work along one dimension, a cradle pivoted on a horizontal axis that is always parallel to the direction of movement of the table, and means for mounting said spindle on said cradle to move on a radius in an arc whereby to form rounded corners on the work, said table being arranged to move to feed the work with respect to the spindle whereby to perform a cutting operation along another dimension thereof.

17. In a milling machine, a frame providing ways thereon, a table reciprocable on said ways to carry work back and forth to be operated upon, a rotary spindle arranged to carry a cutter to operate on the work, a slide for supporting said spindle operating on ways provided on said frame transversely with respect to the aforementioned ways, the work being operated upon along one dimension by movement of said table relative to the spindle and along another dimension by movement of said spindle with its slide relative to the table in a transverse direction, a cradle for tiltably mounting said spindle relative to said slide to incline the cutter relative to a normal whereby to produce bevel cuts on the work, and a rotary support on said cradle for said spindle whereby the spindle is arranged to be moved in an arc relative to said slide about a vertical axis or an inclined axis depending on the position of the cradle to produce arcuate cuts on the work as, for example, in rounding corners.

18. In a machine as set forth in claim 17, the provision of means for adjusting said spindle endwise relative to said carriage to bring the lower end of said spindle to a desired spaced relation relative to the table or to maintain a predetermined spaced relation regardless of an inclination of the spindle from a normal.

19. In a milling machine, a bed, a table reciprocable thereon, a support, a slide movable thereon crosswise with respect to the table, a cradle tiltably mounted on the slide and disposed over the bed and table, a saddle rotatably mounted on the cradle, a spindle support rotatable on the saddle eccentric with respect thereto, and a rotary spindle mounted eccentrically in the spindle support.

20. A milling machine as set forth in claim 19 wherein the rotary spindle is adjustable lengthwise relative to the spindle support toward and away from the table.

21. In a milling machine, a frame, a table reciprocable on ways thereon to carry work back and forth to be operated upon, a rotary spindle arranged to carry a cutter to operate on the work, and means for supporting the spindle above the table permitting the tilting thereof whereby to dispose the cutter at an angle to its normal position in either direction, said table being arranged to move to feed the work relative to the spindle in its normal or inclined positions whereby to perform cutting operations thereon, and permitting the movement of the spindle on a radius in an arc whereby to form rounded corners on the work with the spindle either in a normal or inclined position.

In witness of the foregoing I affix my signature.

JOHN M. MACRAE.